July 28, 1959
E. G. GOETSCH ET AL
2,896,652
GAS TURBINE ISOCHRONOUS GOVERNOR
Filed May 6, 1953
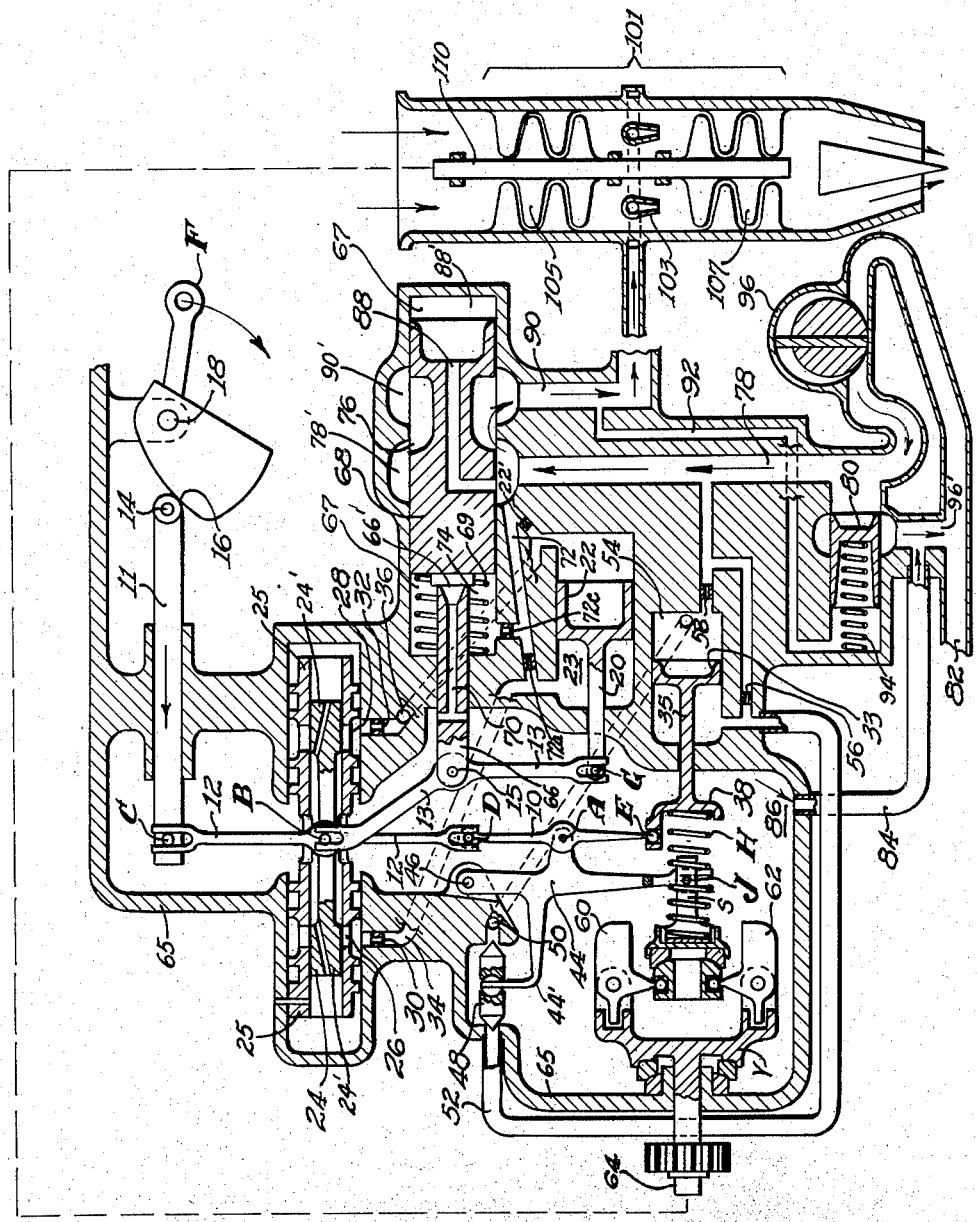
Earl G. Goetsch
Warren H. Cowles
INVENTORS
BY United States Patent Office 2,896,652
Patented July 28, 1959

2,896,652

GAS TURBINE ISOCHRONOUS GOVERNOR

Earl G. Goetsch and Warren H. Cowles, Detroit, Mich., assignors to Holley Carburetor Company, Detroit, Mich., a corporation of Michigan Application May 6, 1953, Serial No. 353,404

11 Claims. (Cl. 137—34)

This invention relates generally to a governor controlled fuel regulating system especially adapted for use in connection with turbo-jet types of engines for maintaining the speed of such engines reasonably constant for a given throttle setting regardless of varying conditions.

It is an object of this invention to provide a system of the above type having means for regulating the flow of fuel to the engine in proportion to the rotative speed of the engine and in proportion to the rate of change of the rotative speed of the engine.

The foregoing as well as other objects will be made more apparent as this description proceeds especially when considered in connection with the accompanying drawing wherein the single figure illustrates a fuel regulating governor embodying the features of this invention.

For the purpose of illustration, the present invention is shown on the drawing in connection with a gas turbine engine 101 of the type comprising a compressor 105, a turbine 107 and fuel jets 103. The jets 103 are suitably supported between the compressor 105 and turbine 107 to discharge the fuel axially toward the turbine 107. The compressor 105 and turbine 107 are mounted on a shaft 110 which is operatively connected, as indicated by the broken line on the drawing, to a shaft 64 journaled in a bearing carried by one wall of a housing 65. The shaft 64 has a yoke Y which projects into a sump 86 formed in the housing 65 and which has a pair of weights 60 and 62 respectively pivotally mounted on the arms of the yoke in a manner to swing outwardly with respect to the axis of the shaft 64 in response to the centrifugal force resulting from rotation of the shaft 64 by the engine drive shaft 110.

The sump 86 is connected by a conduit 84 to a fuel supply conduit 82 which, in turn, is connected to the intake side of a pump 96 having the discharge side connected to a passage 78. A by-pass 96' connects the passage 78 to the supply conduit 82 and the by-pass is normally controlled by a pressure relief valve 80 urged toward its closed position by a spring 94. The passage 78 opens into a cylinder 67 having axially spaced annular recesses 78' and 90' in the inner surface respectively communicating with the passage 78 and a passage 90. The passage 90 is connected to the fuel jets 103 and is also connected by a passage 92 to the side of the relief valve 80 engaged by the spring 94, for reasons to be presently described.

In order to regulate the flow of fuel from the passage 78 to the passage 90, a valve member 68 is slidably mounted in the cylinder 67. The valve member 68 has an annular groove in the periphery arranged to register with the annular grooves 78' and 90' in a manner to provide with the groove 78' a restriction 76 through which fuel flows into the passage 90. The valve member 68 also has a passage 88 arranged with one end in communication with the closed space 88' formed in the cylinder 67 at the outer end of the valve member 68 and with the other end in communication with the annular groove 78'. Thus, the space 88' is maintained at a pressure corresponding to the pressure at the discharge side of the pump 96 and this pressure applies a force on the valve member 68 tending to move the latter inwardly against a spring 69 acting on the inner end of the valve member 68 and against pressure within the chamber 74 also acting on the portion of valve 68 exposed thereto.

As stated above, the passage 90 is connected to the side of the relief valve 80 acted upon by the spring 94 so that this pressure supplements the spring force in tending to close the relief valve 80 against the action of the pump pressure existing in the passage 78. The force applied to the relief valve 80 by the spring 94 is such that this valve is normally in a slightly open position during operation so that a limited quantity of fuel from the discharge side of the pump is continuously by-passed to the supply conduit 82. Thus, the pressure differential between the passages 78 and 90 is maintained substantially constant and depends on the strength of the spring 94.

The valve member 68 is engaged by a pilot valve 66 slidably supported on the housing 65 at the inner end of the valve member 68 in axial alignment with the latter and having the outer end thereof open at 66' and abutting the inner end of the valve member 68. The inner end of the valve 66 extends into the sump 86 and a bleed passage 70 extends axially of the valve 66 from the open mouth 66' at the outer end of the latter. The inner end of the passage 70 communicates with the sump 86 when the valve member 68 is in an open position so that fluid under pressure escaping past the outer end of the valve 66 from the space or chamber 74 in the cylinder 67 at the inner end of the valve member 68 bleeds into the sump 86. The chamber 74 communicates with the passage 78 through a passage 72 having a restriction opening into the chamber 74. When valve 68 is stationary, forces resulting from spring 69 and pressure within chamber 74 balance the force of pressure within chamber 88'.

A lever 13 is pivoted intermediate the ends thereof by a pin 15 to the inner end of the valve 66 and the upper end of the lever 13 pivotally engages a pin B mounted on a servo valve member 24 intermediate the ends of the latter. The servo valve member has heads 24' respectively slidably mounted in aligned cylinders 25 carried by the housing 65 and having ports 26 and 28. The port 26 communicates with a passage 34 through a restriction 30 and the port 28 communicates with a passage 36 through a restriction 32. The passage 34 communicates with a cylinder 23 at the inner side of a piston 22 in the latter cylinder and the passage 36 communicates with the cylinder 23 at the outer side of the piston 22. Passage 72 communicates with cylinder 23 inwardly of piston 22 through restriction 72a. The space in the cylinder 23 at the outer side of the piston 22 also communicates with the passage 78 through a restriction 22'. Projecting inwardly from the piston 22 is a rod 20 having the inner end pivoted by a pin G to the lower end of the lever 13.

A lever 12 is pivoted intermediate the ends to the valve member 24 by the pin B. The upper end of the lever 12 is pivoted by pin C to the inner end of a rod 11 having a roller 14 at the outer end engageable with a cam 16. The cam 16 is pivoted by a pin 18 to a part of the housing 65 and is actuated by an arm F having a connection (not shown) to suitable manual speed selection mechanism. The inner end of the rod 11 extends into the sump 86 which is maintained at a pressure above atmospheric (30 or 35 p.s.i.) which biases the rod 11 in a direction toward the cam 16 and maintains roller 14 at all times in contact with cam 16.

The above arrangement is such that movement of the arm F in the direction of the arrow shown in the drawing rotates the cam 16 in a direction to shift the rod 11 inwardly. As a result, the lever 12 swings counterclockwise about a pin D engaging the lower end of the lever 12, and the valve member 24 shifts in a direction to open the port 26 and close the port 28. Thus, the cylinder 23 at the inner end of the piston 22 is connected to the sump 86 and the piston 22 moves inwardly at a rate dependent on the size of the restriction 22'. Inward movement of the piston 22 imparts an inward movement to the valve member 66 through the lever 13. Separation of valve 66 from valve 68 vents chamber 67 to the sump through passage 70 and the higher pressure within chamber 88' overcomes spring 79 and causes valve 68 to follow valve 66. Thus, valve 66 also moves inwardly to increase the flow of fuel from the passage 78 to the passage 90. Of course, movement of the cam 16 in a direction opposite the direction aforesaid by the lever F reverses the above operation and reduces the amount of fuel admitted to the passage 90 from the passage 78 past the valve member 68. This is accomplished by seating of valve 66 on valve 68, which causes pressure within chamber 74 to build up as a result of restricted flow through passage 72 and restriction 72c to a value which, with spring 69, overcomes pressure within chamber 88'.

The pivot pin D at the lower end of the link 12 is carried by the upper end of a link 10 pivoted intermediate the ends by a pin A on a lever 44 and having a ball joint connection E at the lower end with an abutment 38. The lever 44 has a part intermediate the ends supporting the pivot pin A and has the upper end pivoted by a pin 46 on the housing 65. The lower end of the lever 44 is pivoted by a pin J to a shaft S mounted in a manner not shown herein for sliding movement in directions toward and away from the abutment 38, and connected in a conventional manner to the centrifugal weights 60 and 62 for actuation by the latter. The operative connection between the weights and shaft is such that outward movement of the weights by centrifugal force, resulting from rotation of the shaft 64, shifts the shaft S in a direction toward the abutment 38. Movement of the shaft S in a direction away from the abutment 38 upon a decrease in the centrifugal force acting on the weights is accomplished by a spring H having one end engaging the abutment and having the opposite end engaging a shoulder on the shaft S.

The abutment 38 is movable toward and away from the shaft S by a piston 33 slidably mounted in a cylinder 54 and connected to the abutment 38 by a rod 35. The end of the cylinder 54 at the outer side of the piston 33 communicates with the pressure passage 78 through a restriction 58 and the end of the cylinder 54 at the inner side of the piston 33 communicates with the pressure passage 78 through a restriction 56. Also, the spaces in the cylinder 54 at opposite sides of the piston 33 respectively communicate with the sump 86 through passages 50 and 52. The passages 50 and 52 are alternately opened and closed by a slide valve 48 pivoted intermediate the ends to an arm 44' projecting laterally from the lever 44 intermediate the ends of the latter.

Assuming now that the governor senses an increase in speed, the shaft S moves in a direction toward the abutment 38 and swings the lever 44 about the pin 46 in a direction to shift the valve member 48 in a direction to close the passage 50 and open the passage 52. As a result of the above, the pressure in the cylinder 54 at the outer side of the piston 33 is increased and the pressure in the cylinder 54 at the inner side of the piston 33 is reduced. Thus, the piston 33 and the abutment 38 move inwardly at a rate dependent on the size of the restriction 58, and the resistance offered by the spring H to outward movement of the weights 60, 62 is increased. As a consequence, the shaft S is moved in a direction away from the abutment 38 and the lever 44 is swung in a direction about the pin 46 to shift the valve member 48 toward its closed position with respect to the passage 52. This arrangement assures maintaining the required pressure differential across the piston 33.

During the above mentioned overspeed condition the pivot pin D is shifted towards the valve 66 by the lever 10 as the latter swings about the pivot pin E. Since the pivot pin D engages the lower end of the lever 12, the latter is swung about the pivot pin C to shift the servo valve member 24 to the right to open the port 28. Thus, the pressure in the cylinder 23 at the inner side of the piston 22 becomes greater than the pressure in the cylinder 23 at the outer side of the piston 22 and the latter moves outwardly. Movement of the piston 22 outwardly swings the lever 13 counterclockwise about the pin B in a direction to move both the pilot valve 66 and the fuel valve 68 outwardly to reduce the amount of fuel entering the jet supply passage 90 from the relatively high pressure fuel passage 78.

It has been stated above that when an overspeed condition exists the governor shaft S carrying the pivot pin J shifts in a direction towards the abutment 38 and thereby swings the lever 44 about the pin 46 in a direction to actuate the valve 48 to increase the restriction to flow of fluid under pressure from the passage 50 to the sump 86 and decrease the restriction to flow of fluid from the passage 52 to the sump 86. Thus, the piston 33 moves inwardly or to the left and swings the lever 10 about the pivot pin A in a direction to move the pivot pin D an additional increment outwardly or to the right towards the valve 66. This excessive or additional movement of the pivot pin D, occurring after the instantaneous initial throttling of flow by the initial shifting of valve 48, causes a further reduction in the quantity of fuel delivered to the engine jets 103 for the reason noted above. The additional reduction of fuel delivered to the engine jets 103 and resulting from displacement of pivot pin D by the governor shaft S may be termed a speed derivative contribution following the initial instantaneous adjusting movements, as will be further described, because the rate of change of the engine speed determines the magnitude of the error which is responsible for the additional displacement aforesaid of the pivot pin D to further reduce the supply of fuel from the passage 78 to the jets 103.

When the governor senses a drop in engine speed below the predetermined selected speed, the above operations are in most respects reversed to increase the amount of fuel admitted to the engine jets 103 from the fuel passage 78. Thus, the fuel supplied to the engine jets 103 is controlled in proportion to the rotative speed of the engine and also in proportion to the rate of change of the rotative speed of the engine.

Due to space consideration, the valve member 68, piston 22 and piston 33 are not of the balanced type. Hence, it may appear on a cursory examination that the aforesaid elements may move inwardly when the device is "on-speed." However, for reasons explained above, when the piston 22, for example, moves inwardly, the lever 13, pin 15, pilot valve 66 and fuel valve 68 follow, thus increasing the fuel flow to the engine jets 103. The resulting increase in engine speed causes the weights 60 and 62 to move outwardly due to increased centrifugal force. The outward movement of the weights is accompanied by movement of the pin J in a direction towards the abutment 38 and by a corresponding movement of the pivot pin A through the medium of the lever 44. As a result, the lever 10 swings outwardly about the pivot pin E and pivot pin D is displaced outwardly to swing the lever 12 in a corresponding direction about the pin C. Thus, the servo valve 24 is moved to the right to reduce the pressure in the cylinder 23 at the outer side of the piston 22 and thereby counteract any tendency for the piston 22 to move inwardly. In other words, the structure is such that the unbalanced condition in cylinder 23 is tolerable and is overcome by a slight shift in the null position of the servo valve 24.

In connection with the unbalanced condition that may exist in the cylinder 54, it will be noted that this unbalance is overcome by locating the servo valve 48 in a displaced null position. With reference to the unbalanced condition of the fuel valve 68, it will be noted that the valve 66 is connected to the same lever 13 as the piston 22 and, hence, is compensated for in the same manner defined in connection with the piston 22.

The complete apparatus has been described in the foregoing, together with certain phases of the operation. For a more complete understanding of the functioning and operation of the system there will now be described the sequence of events which takes place upon an assumed increase in speed. Before describing the sequence of events in detail it is desired to emphasize that the operation of the system disclosed herein is dependent upon a time factor introduced by restricting flow of actuating fluid to the power pistons and that the relative time or sequence of events is an essential part of the operation of the present system.

It is assumed that the controlled engine is operating "on speed" with the parts in the position illustrated in the figure. Suppose now that for some reason there is an increase in speed. This increase in speed is effective in the first instance only on the centrifugal elements 60 and 62 of the governor and result in an outward movement of the toes of the weights 60 and 62, which in turn results in an equivalent movement of the shaft S to the right. Since the shaft S is directly coupled to the lever 44 by the pin J, and since the lever 44 is pivoted to the stationary pin 46, this in turn results in two simultaneous events.

In the first place, since the system was assumed to be in equilibrium the valve 48 will have been in a position to maintain the necessary pressures at opposite sides of the piston 33 to maintain the piston in a stationary position against extraneous forces, including the reaction of the governor spring H. Accordingly, until movement of the valve 48 can result in a sufficient flow of fluid to permit movement of the piston abutment 38, the axis of the pivot E may be regarded as instantaneously fixed. Accordingly, the counterclockwise rotation of the lever 44 which results concurrently with movement of the shaft S to the right will result in a clockwise rotation of the lever 10 about the axis of pivot E. This has the instantaneous effect of moving the pivot D to the right as seen in the figure. Since we are analyzing results flowing from an increase in speed as the sole initiating factor, the axis of the pivot point C is assumed to be fixed, and accordingly movement of the pivot D to the right will result in an instantaneous concurrent rocking movement of the lever 12 in a counterclockwise direction about the axis of stationary pin C. This in turn will have the instantaneous result of shifting the pivot point B to the right which in turn has two separate results. The first of these results is the rocking of the lever 13 about the instantaneously fixed pivot point G with corresponding movement of the pilot valve 66 to the right. This in turn effects concurrent simultaneous equal movement of the fuel valve 68 to the right to reduce the restriction 76 and permit less fuel to flow to the engine.

All of the foregoing events take place instantaneously or simultaneously with movement of the shaft S.

Reverting to the secondary results, the rocking movement of the lever 44 about its fixed pivot 46 shifts the valve 48 to the right restricting exhaust of fluid under pressure from cylinder 54 to the right of piston 33. Accordingly, as fluid under pump pressure enters the right hand end of the cylinder 54 through the restriction 58, there is a delayed movement of the piston 33 and the spring abutment seat 38 to the left, thus imposing forces tending to restore the shaft S and the centrifugal weights to their normal position. The resulting movement to the left of the shaft S has the effect of rocking the lever 44 in the reverse direction tending to restore the valve 48 to its null position in which it maintains pressures at opposite sides of the piston 33 at the values necessary to restore equilibruim.

As another secondary effect subject to time delay, the rocking movement of the lever 12 which resulted in movement of the lever 13 to move the fuel valve, also had the effect of shifting the servo valve 24 to the right in a direction to uncover the port 28 and to permit the exhaust of fluid under pressure from the right hand side of the piston 22. This has the effect of causing the piston 22 to move to the right. This motion is transmitted to the pivot G of the lever 13 and causes the lever 13 to swing counterclockwise about the pivot B, thus producing further movement of the pilot valve 66 to the right with a further incremental adjusting movement of the fuel valve 68.

It will be observed that the time delayed motion of the piston 33 to the left is accompanied by a rocking of the lever 10 in a clockwise direction about the axis of pivot A and this in turn produces counterclockwise rocking of the lever 12 about the stationary axis C with corresponding incremental shifting of the servo valve 24, which in turn effects incremental adjusting of pilot valve 66.

As previously described, the greatest time delay is introduced into movement of the piston 22 as a result of movement of the servo valve 24.

From the foregoing it will be observed that simultaneously with shifting of the shaft S in response to an increase in speed, lever 44 assumes a new position which initiates a time delayed adjustment of the piston 33 and which effects a substantially instantaneous adjustment of the fuel valve through the instantaneous rocking of the levers 10, 12 and 13. The time delayed movement of the piston 33 introduces a gradual or controlled readjustment, specifically, increasing compression of the governor spring H tending to shift the shaft S to the left. Movement of the piston 33 to the left also effects a simultaneous rocking of levers 10, 12 and 13. Rocking movement of the lever 12 effected a shifting of the servo valve 24 introducing a slower resultant re-adjustment of the piston 22, which in turn effects rocking of the lever 13 about the pivot B and a resultant repositioning of the pilot valve 66.

The drawings and the foregoing specification constitute a description of the improved gas turbine isochronous governor in such full, clear, concise and exact terms as to enable any person skilled in the art to practice the invention, the scope of which is indicated by the appended claims.

What we claim is:

1. In a fuel control system for a fuel burning engine operable at a speed which varies in proportion to changes in fuel flow, a structure providing a fuel delivery passage adapted to communicate with the engine and a fuel supply passage adapted to communicate with a source of fuel under pressure, a centrifugal governor having a rotatable part adapted to be driven by the engine and having an element movable in one direction in response to an increase in speed of the rotatable part and movable in the opposite direction in response to a decrease in speed of said rotatable part, means for regulating the flow of fuel between said passages including a valve having a chamber communicating with said passages and adapted to communicate the same with one another, a valve member movable in one direction in said chamber to increase the flow of fuel from the supply passage to the delivery passage and movable in the opposite direction in said chamber to decrease the flow of fuel from the supply passage to the delivery passage, the chamber being connected at opposite ends of the valve member to the supply passage, spring means acting on one end of the valve member urging the latter in a direction to decrease the flow of fuel from the supply passage to the delivery passage, a piston slidably mounted in a cylinder having the spaces at opposite ends of the piston respectively communicating with the fuel supply passage, a fuel return chamber also respectively communicating with the cylinder at opposite ends of the piston, a servo valve movable in opposite directions to successively regulate communication between the fuel return chamber and opposite ends of said cylinder, a link mechanically connecting the piston to the servo valve, a pivotal support for the link movable as a unit with the fuel regulating valve member, and an operative connection between the servo valve member and the governor element aforesaid.

2. The structure defined in claim 1 comprising a manually operable member operatively connected to the servo member for moving the latter in opposite directions and biased in a direction to move the fuel regulating valve member in a direction to reduce the flow of fluid from the supply passage to the delivery passage.

3. The structure defined in claim 1 wherein the operative connection between the servo valve member and the governor element is responsive to an increase in speed of the engine part to move the servo valve member in a direction to cause movement of the fuel regulating valve member in a direction to reduce the fuel flow from the supply passage to the delivery passage.

4. The structure defined in claim 3 having means for yieldably resisting movement of the governor element in response to an increase in speed of the engine part, said means comprising a second piston slidable in a second cylinder having spaces at opposite ends of the second piston respectively communicating with the fuel supply passage, a pair of ports respectively connecting the second cylinder at opposite ends of the second piston with the fuel return chamber, a second servo valve member alternately movable in opposite directions to respectively increase and decrease fluid flow through said ports, spring means between the second piston and governor element opposing movement of the governor element by an increase in speed of the engine part, and a connection between the governor element and second servo valve member for operating the latter.

5. The structure defined in claim 4 wherein the connection between the second servo valve member and governor element comprises a lever having a fixed fulcrum and having a pivotal connection with the governor element and said second servo valve member.

6. The structure defined in claim 5 wherein the operative connection between the first named servo valve member and governor element comprises a link pivoted intermediate the ends on said lever, a part movable by the second piston aforesaid and pivotally connected to one end of said link, and a pivotal connection between the opposite end of the link and first servo valve member.

7. The structure defined in claim 6 wherein the pivotal connection between the link and first servo valve member comprises a second link pivoted intermediate the ends on the first named servo valve member and having one end pivoted to said first mentioned link, and a member pivoted to the opposite end of the second link and normally biased to move the first named servo valve member in a direction to shift the fuel regulating valve member in a direction to reduce the flow of fuel from the fuel supply passage to the delivery passage.

8. In a fuel control system for a fuel burning engine operable at a speed which varies in proportion to changes in fuel flow, a structure providing a fuel delivery passage adapted to communicate with the engine and a fuel supply passage adapted to communicate with a source of fuel under pressure, a centrifugal governor having a rotatable part adapted to be driven by the engine and having an element movable in one direction in response to an increase in speed of the rotatable part and movable in the opposite direction in response to a decrease in speed of said rotatable part, a piston slidable in a cylinder having spaces at opposite ends of the piston respectively communicating with the fuel supply passage, a relatively low pressure chamber, a pair of ports respectively connecting said chamber to the cylinder at opposite sides of the piston therein, a servo valve member movable in opposite directions to alternately increase and decrease fluid flow through said ports, a lever supported for swinging movement and connected to the governor element for operation by the latter, means connecting the servo valve member to the lever whereby swinging movement of the lever in opposite directions shifts the servo valve member in opposite directions, a link pivotally mounted on the lever for swinging movement relative to the lever and pivotally connected to the piston, a valve member for regulating the flow of fuel from the fuel supply passage to the delivery passage, and means responsive to swinging movement of the link about either of its pivotal connections aforesaid to actuate the fuel regulating valve member.

9. A speed governor for an internal combustion engine comprising a movable member movably operable under a force dependent on engine speed, resilient means opposing movement of said member under said force, first servo mechanism controlled by movement of said member in either direction from a null position to initiate adjustment of the effectiveness of said resilient means to restore said member to null position, lever mechanism including a first lever pivoted to said member and fuel valve operating means connected to said lever, means connecting said first servo mechanism and lever to adjust said first lever relative to said member, and effect an initial adjustment of said fuel valve operating means, said fuel valve operating means comprising a second lever, and second servo mechanism controlled by movement of said second lever to initate a delayed adjustment of said fuel valve operating means.

10. In a fuel control system for a fuel burning engine operable at a speed which varies in proportion to changes in fuel flow, a structure providing a fuel delivery passage adapted to communicate with the engine and a fuel supply passage adapted to communicate with a source of fuel under pressure, a centrifugal governor adapted to be driven by the engine and having an element movable in one direction in response to an increase in speed of the engine and movable in the opposite direction in response to a decrease in speed of said engine, a piston slidable in a cylinder having spaces at opposite ends of the piston respectively communicating with the fuel supply passage, a relatively low pressure chamber, a pair of ports respectively connecting said chamber to the cylinder at opposite sides of the piston therein, a servo valve member movable in opposite directions to alternately increase and decrease fluid flow through said ports, an operative connection between the servo valve member and governor element for actuating said servo valve member upon movement of the governor element, comprising a lever supported for swinging movement and connected to both the servo valve member and governor element, a link pivoted intermediate its ends on said lever and having one end pivotally connected to the piston, and means responsive to swinging movement of the link and operatively connected to the other end of the link for actuating said fuel regulating valve member, means yieldably opposing movement of the governor element in response to an increase in speed of the engine part including a part movable by said piston and yieldably engaging the governor element, and means operated by the governor element for regulating the flow of fuel from the supply passage to the delivery passage, comprising a valve member movable in one direction to decrease the flow of fuel from the supply passage to the delivery passage and movable in the opposite direction to increase the flow of fuel from the supply passage to said delivery passage.

11. A speed governor adapted to be operated by and to control an engine comprising an engine speed control device, centrifugal means adapted to be driven at a speed proportional to engine speed and including an element movable thereby, spring means opposing movement of said element by said centrifugal means in response to a predetermined change in speed of the latter, means for adjusting the effectiveness of said spring means, control means operable to initiate adjustment of said spring means in a direction to restore said element to its previous position upon movement of said element in response to said change in speed of said centrifugal means and to continue such adjustment until said element returns to its previous position, means connected to said element operable to effect substantially instantaneous adjustment of said engine speed control device corresponding to the movement of said element, and means operable responsive to the difference in position of said element due to such movement to initiate a slow additional adjustment of said device in the same direction.

References Cited in the file of this patent
UNITED STATES PATENTS

| | | |
|---|---|---|
| 980,616 | Dole | Jan. 3, 1911 |
| 2,020,847 | Mitereff | Nov. 12, 1935 |
| 2,168,155 | Caughey | Aug. 1, 1939 |
| 2,376,844 | Ziebolz | May 22, 1945 |
| 2,565,041 | Parker | Aug. 21, 1951 |
| 2,573,724 | Neal | Nov. 6, 1951 |
| 2,612,944 | Orr | Oct. 7, 1952 |
| 2,633,830 | McCourty et al. | Apr. 7, 1953 |
| 2,758,811 | Peterson | Aug. 14, 1956 |